UNITED STATES PATENT OFFICE.

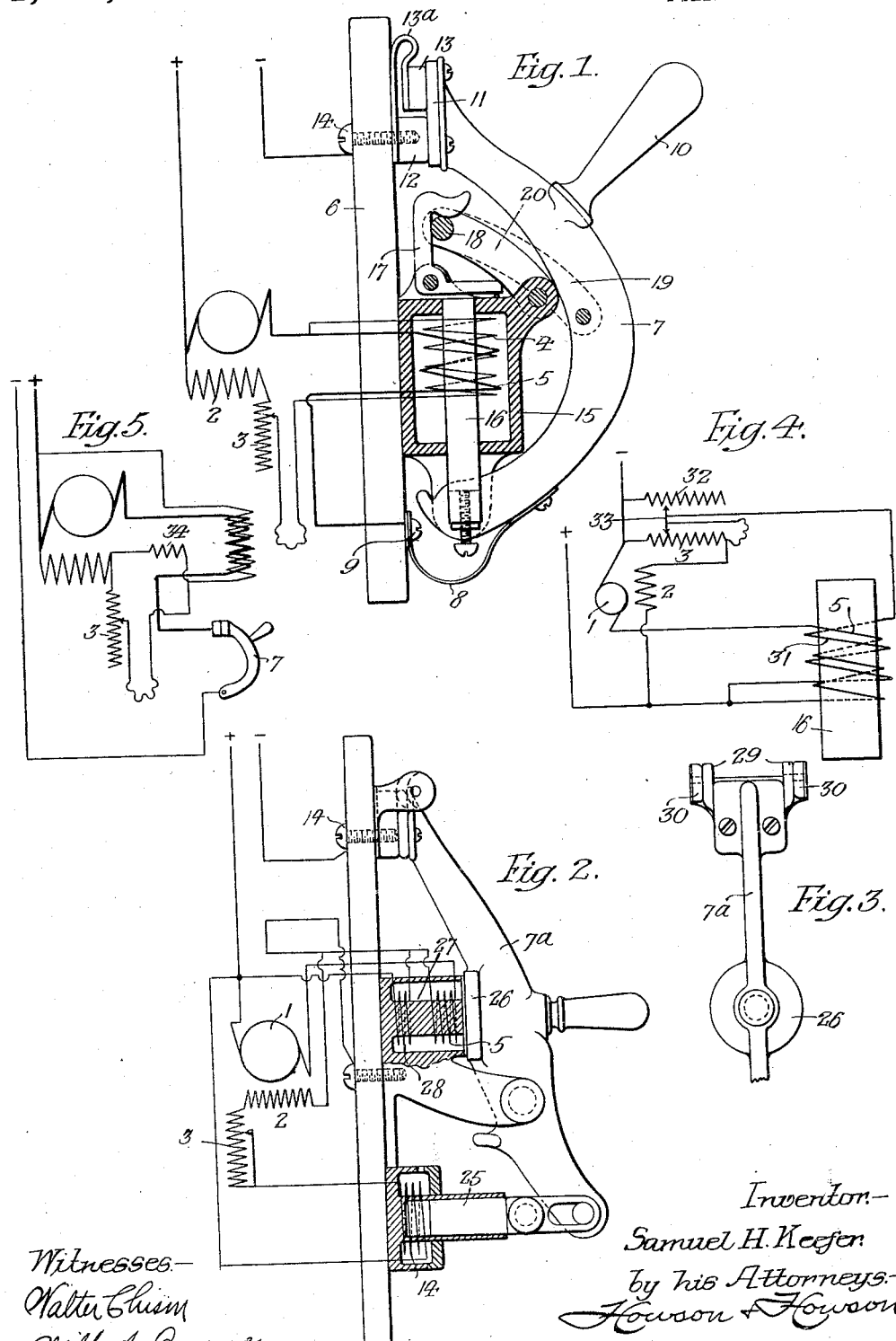

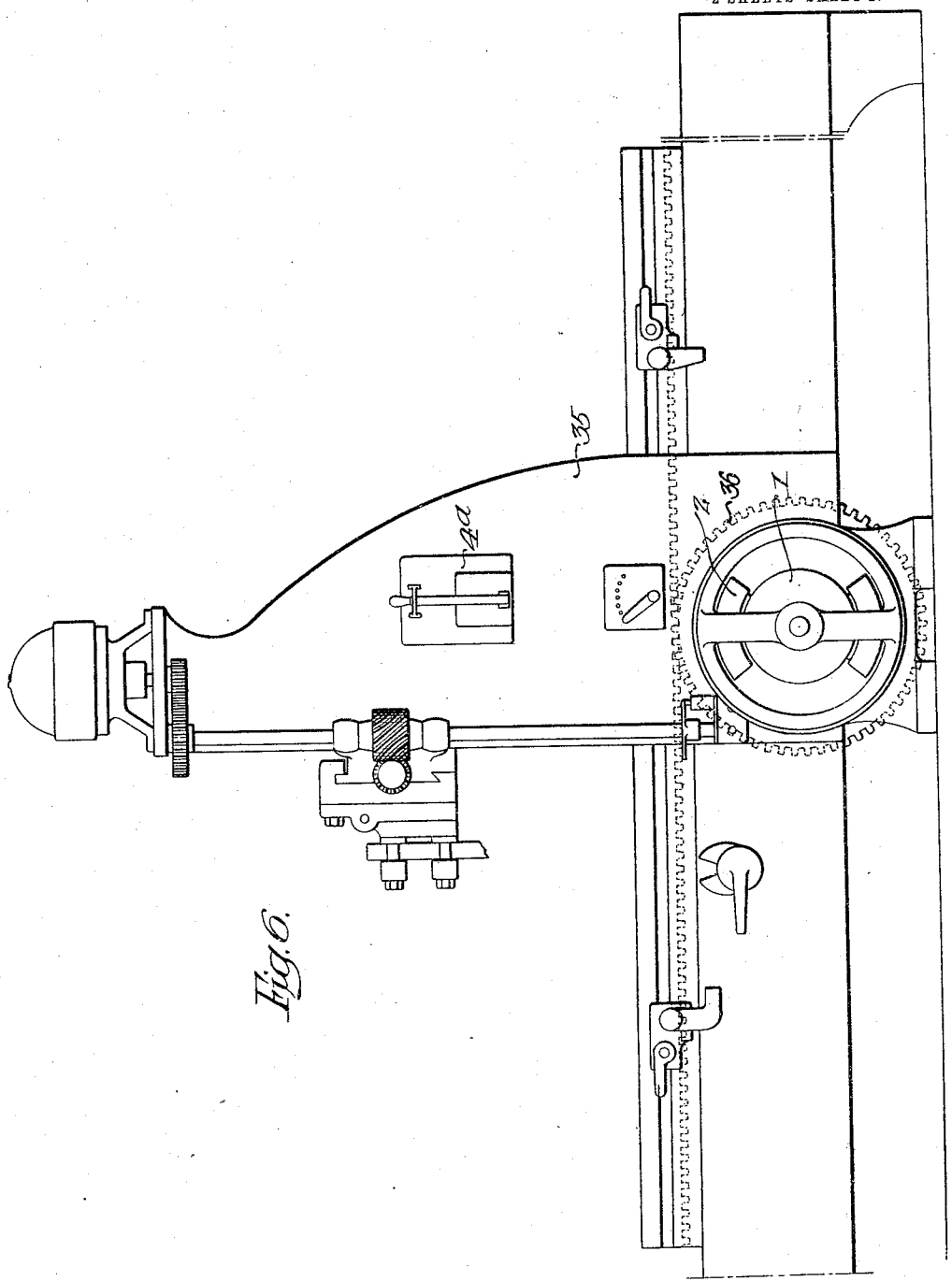

SAMUEL H. KEEFER, OF PLAINFIELD, NEW JERSEY; MAE E. KEEFER, ADMINISTRATRIX OF SAID SAMUEL H. KEEFER, DECEASED, ASSIGNOR TO NILES-BEMENT-POND COMPANY, OF NEW YORK, N. Y., A CORPORATION OF NEW JERSEY.

SPEED-DEPENDENT MOTOR-CONTROLLING APPARATUS.

1,124,142.    Specification of Letters Patent.    Patented Jan. 5, 1915.

Application filed May 29, 1911, Serial No. 630,030. Renewed May 26, 1914. Serial No. 841,154.

*To all whom it may concern:*

Be it known that I, SAMUEL H. KEEFER, a citizen of the United States, and a resident of Plainfield, in the county of Union, State of New Jersey, have invented certain Improvements in Speed-Dependent Motor-Controlling Apparatus, of which the following is a specification.

One object of my invention is to provide apparatus for use in connection with electric motors, particularly those of the shunt or compound wound type, which shall automatically act to cut off current from the motor whenever the current flowing either in its armature or in its field circuit increases beyond a predetermined amount or when the combined action of both of said currents exceeds a predetermined limit; it being especially desired that the apparatus shall among other things depend for its action upon the speed of the motor.

I further desire to provide a system of motor control which shall include circuit opening means capable of actuation by either of two or more coils, as the case may be, which coils shall be so connected as to be directly in circuit with or in some way dependent upon the armature and field circuits of the motor in order that they may be capable of acting either independently or together to automatically break the motor circuit whenever the current flow in these elements of the motor rises above predetermined amounts.

Another object of my invention is to provide an apparatus particularly designed to govern the amount of current flowing to either the armature or field of an electric motor and thereby prevent variation in the speed of the motor beyond predetermined points; it being desired that the arrangement shall be such as to cut off current from the motor either when the flow of such current through the armature exceeds such a point as might injure said armature or the machine driven thereby, or whenever the field current has been so far varied as to bring the speed to such a point as to overload the gearing or other equivalent parts of a machine driven by the motor, or when the armature and field currents considered together exceed a predetermined safe amount.

These objects and other advantageous ends I secure as hereinafter set forth, reference being had to the accompanying drawings, in which;—

Figure 1, is a side elevation partly in section and to some extent diagrammatic illustrating a relatively simple form of my invention; Fig. 2, is a side elevation also partly in section showing a modified form of the invention in which a permanently energized coil is caused to coöperate with a winding in circuit with the armature of the motor in order to accomplish the desired results; Fig. 3, is a fragmentary front elevation illustrating a detail of the construction of part of the apparatus shown in Fig. 2; Figs. 4 and 5 are diagrammatic views illustrating special forms of my invention, and Fig. 6, is a diagrammatic view of a motor driven machine with its associated apparatus arranged according to my invention.

In the above drawings, 1 represents the armature and 2 the shunt field winding of an electric motor whose speed may be varied within certain limits by varying the quantity of the resistance 3 which is connected in series with said field winding.

In order to accomplish the objects noted, I provide in that form of my invention shown in Fig. 1, some suitable form of circuit breaking device 4$^a$ of such a construction as to be dependent for its action upon either or both of two coils 4 or 5. One of these coils as 4 is connected in series with the shunt field winding 2, while the other is in series with the armature 1 of the motor. The circuit breaker in this case consists of a supporting base 6 of insulating material on which is pivotally mounted a movable arm or blade 7, connected through a flexible conductor 8 with a terminal 9 to which is connected one end of the coil 5 whose opposite end is connected to one of the armature terminals. This arm or blade 7 is provided with a handle 10 and its upper end carries a contact plate 11 designed to first engage an auxiliary contact 13 and then a main contact 12 when moved to its closed position. A terminal 14 is connected to the main contact 12 which in turn is connected to one of the current supply mains, in the present instance the negative. The two coils 4 and 5 are mounted within a casing 15 having a vertically movable core 16 upon which said coils act. This core in turn is placed to act upon a trip lever 17 designed to engage a cross pin 18 connected to one or more links 19 shown in dotted lines; the upper end of this lever being hooked so as to retain the arm or blade 7 in its closed position under normal conditions. One or more other links 20 are pivoted to the casing 15 and likewise engage the cross pin 18.

One terminal each of the field and armature of the motor is connected to the second current supply main, in the present instance the positive, and under operative conditions it is obvious that if more than a predetermined amount of current flows through the armature of the motor and hence through the coil 5, the latter will draw upwardly the core 16 so that it is caused to strike one arm of the trip lever 17, thereby so moving this as to cause it to release the pin. As a result the arm or blade 7 is forcibly turned on its pivot either under the action of gravity or by means of suitable springs, such for example, as a spring 13ª on which the auxiliary contact 13 is carried. The contact is thus broken between the plate 11 and contacts 12 and 13, and current is cut off from the motor.

The coil 4 is of such design that in case the field current of the motor increases beyond a predetermined point, it likewise will forcibly draw upward the core 16 and also cause release of the holding pin 18 and separation of the contacts 11, 12 and 13, even though the armature current of the motor may be well below its allowable maximum. Such an arrangement of apparatus is particularly desirable in combination with a machine tool driven by a motor. In such case it is desirable that the motor circuit shall be opened to automatically stop the machine in case the motor should be dangerously overloaded and for this purpose the increased armature current would, as above explained, sufficiently energize the coil 5 to accomplish this end. So far as I am aware, no means has ever been provided whereby the motor circuit would be automatically opened in case this same motor should be used at a reduced speed and in such manner as to dangerously overload the gearing or the equivalent parts of the machine to which it was attached. By my invention, however, the coil 4 may be so arranged as to act with the coil 5 to cause the opening of the motor circuit under these conditions, for in such case the field current would naturally have been increased, with the result that said coil 4 with the coil 5 actuate the core 16 to release the circuit controlling arm 7. The coils 4 and 5 thus act together to trip the breaker at an amperage dependent on the load and motor speed.

As is obvious, there are a number of ways of securing the same desirable result as that above indicated, with slight modifications of the apparatus described, as for example in Fig. 2, I have so arranged the two coils which are respectively in circuit with the armature and field of the motor that these act on different and widely separated parts of the circuit breaker, although they are both capable of causing opening of the motor circuit whenever the armature current or the field current rises above predetermined safe amounts or when the combined action of these two currents exceeds a predetermined point or limiting amount. In this case the circuit breaker is provided with a pivotally mounted blade or arm 7ª, to one end of which is connected a core or plunger 25 acted on by the coil 14, which as before, is connected in circuit with the motor field winding 2. Said arm or switch blade 7ª likewise has an armature plate 26 placed to be acted on by an electromagnet 27 having in this instance a plurality of windings, of which that indicated at 5 is connected in series within the armature 1 of the motor. The second winding 28 of this magnet is permanently connected across the current supply mains although in such manner as to be opened when the motor circuit is opened by the movement of the blade 7ª. In this instance the coils 5 and 28 are so wound that as long as the motor is supplied with current not exceeding the safe and predetermined amount, they cause the core 27 and its associated parts to so act on the armature plate 26 as to retain the arm or blade in a position to permit current to flow to the motor. If, however, the armature current in the coil 5 increases beyond a predetermined amount, this latter coil overcomes the effect of the coil 28 by neutralizing the same, whereupon the switch arm 7ª is moved to its open position either by a spring or by action of the coil 14 on the core 25. At the same time if the field current of the motor increases beyond the predetermined safe amount, the coil 14 is so far energized as to draw the core 25 inwardly and turn the arm 7ª on its pivot to move its plate 26 away from the core 27, regardless of the action of the permanently energized core 28. In this instance the arm 7ª is provided at its upper end with a pair of auxiliary contacts 29 so placed as to engage fixed auxiliary contacts 30 electrically connected to the terminal 14.

In another form of my invention I may, as before, provide a circuit breaker or automatic switch having a core 16 acted on by a coil 5 in series with the armature of the motor and also acted on by a second coil 31 which, as shown in Fig. 4, instead of being in series with the field is in shunt thereto. In this case I provide not only the field resistance 3 but a secondary body of resistance 32 designed to be used in circuit with the second winding or coil 31; the arrangement being such that this latter resistance is decreased by such a movement of the rheostat arm 33 as is necessary to decrease the resistance in circuit with the field winding 2 of the motor. In order that the variation in the shunt field current may be, as nearly as possible, inversely proportional to the speed of the motor when the latter is varied, I may connect any desired or suitable coil 34 in shunt to the field resistance 3 as shown in Fig. 5, this coil if desired being the winding of the brake magnet commonly used in connection with certain classes of motor driven machinery. In any case, however, it is seen that I provide means whereby the motor circuit is broken whenever either the armature or the field current rises above a predetermined amount or when the combined effect of these currents exceeds such an amount, thereby preventing injury both to the motor as well as to the machine driven thereby.

In Fig. 6, I have shown a motor driven machine 35 connected to a motor 1—2 through power transmission mechanism 36, the motor being equipped with the circuit breaking device designed and arranged to operate as heretofore described.

I claim:—

1. A system including a motor having an armature and a shunt field winding; with means for automatically opening the motor circuit when the current either in the armature or in the field rises above predetermined amounts.

2. A system including a motor having an armature and a shunt field winding; with means for automatically opening the motor circuit both when the current in the armature exceeds a predetermined amount and also whenever the motor operates at a predetermined speed below the normal.

3. A system including a motor having an armature and a shunt field winding; with a circuit breaking device for the motor; said device having a plurality of windings respectively in circuit with the field winding and with the armature of said motor; and means controlled by said windings for breaking the motor circuit whenever either the armature or the field currents exceed predetermined amounts.

4. The combination of a motor having an armature and a field winding; a switch connected in the motor circuit and including a movable member; coils respectively connected to have the current flow in them vary with the current flow in the armature and field windings respectively; with means whereby said coils are caused to act upon the movable switch member so that the flow of current above a predetermined amount in either of them will cause opening of said switch.

5. The combination of a motor having an armature and a field winding; a body of resistance for controlling the flow of current to said field winding; a shunt to said resistance; a switch in the motor circuit; and means for governing the opening of the movable member of said switch, the same including two windings respectively in circuit with the armature and field of the motor; and means acted on by the windings for automatically causing opening of the switch when more than predetermined amounts of current flow in either of said windings.

6. The combination of a machine having power transmitting mechanism; an electric motor for actuating said machine through said mechanism; and means for automatically opening the motor circuit whenever the motor speed is reduced below the normal to a point such as would overload the power transmitting mechanism without overloading the motor.

7. The combination of a machine having power transmitting mechanism; a motor for driving said machine through said mechanism; and automatic means for opening the motor circuit both when the armature current of said motor exceeds a predetermined amount and also when the motor is operating at a speed below the normal such as would overload the power transmitting mechanism without overloading the motor.

8. The combination of a machine including power transmitting mechanism; a motor for driving said machine through said mechanism; with a device for automatically breaking the motor circuit both when the total load on the motor exceeds a predetermined amount and also when the load on the power transmitting mechanism exceeds a predetermined amount at a speed of the motor below the normal.

9. The combination of a machine including power transmission mechanism; a motor for driving said machine through said mechanism; and means for automatically opening the motor circuit both when the armature or the field currents of the motor exceed predetermined amounts and also when the sum of said currents exceeds a predetermined amount.

10. In an electrical system, a motor stopping device comprising, in combination, a motor having an armature and shunt field windings, circuit making and breaking means, and means adapted to influence the operation of said first means, said second means being influenced by and responsive to conditions in the circuit containing said armature and said shunt field windings respectively.

In testimony whereof, I have signed my name to this specification, in the presence of two subscribing witnesses.

SAMUEL H. KEEFER.

Witnesses:
WILLIAM E. BRADLEY,
WM. A. BARR.